Jan. 13, 1942.  F. M. ALLEN ET AL  2,269,431
FLEXIBLE PIPE JOINT
Filed Feb. 7, 1940
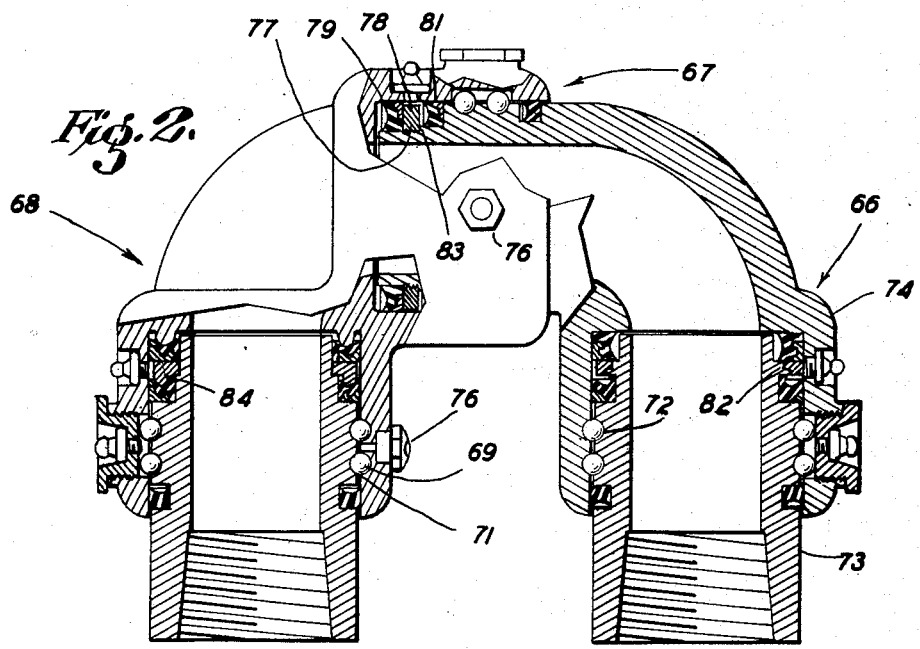
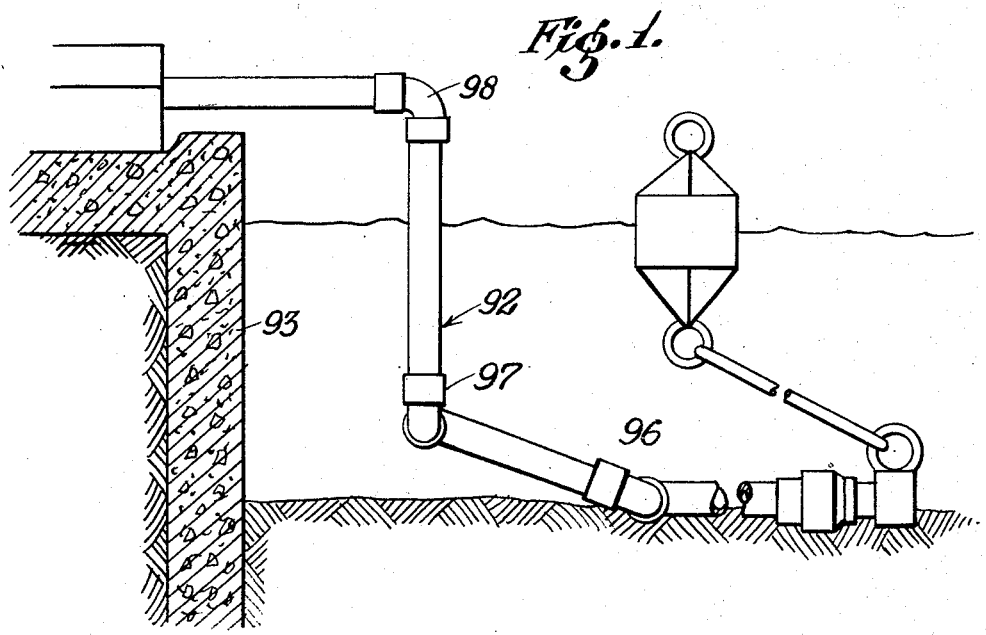
INVENTOR.
FRANK M. ALLEN
CLYDE B. TAYLOR
BY
Stuart M. Maule
ATTORNEY.

UNITED STATES PATENT OFFICE 2,269,431

FLEXIBLE PIPE JOINT

Frank M. Allen, near Azusa, and Clyde B. Taylor, Anaheim, Calif., assignors to The All-Flex Corporation, Los Angeles, Calif., a corporation of California Application February 7, 1940, Serial No. 317,740

2 Claims. (Cl. 285—97.9)

This invention relates to pipe joints or couplings, and more particularly to couplings of such a nature that they permit relative motion between the pipes or other conduits which they serve to interconnect and yet establish a sufficiently tight seal between the conduits to prevent the escape of whatever material the conduits may contain in spite of a material pressure differential inside and outside the conduits.

An object of our invention is to improve upon known types of flexible conduit couplings, or "swing joints," as they are known in the trade, to the extent that they may be relied upon to conduct such difficult fluids to confine as superheated steam or ethyl fluid, without escape between the sections of the coupling, and yet without restricting freedom of movement of the coupling sections with respect to each other, i. e., without impairing the flexibility of the joint.

A more detailed object of the present invention is to provide, in a flexible pipe joint, a novel type of packing member, comprising a pair of elements, one of which is of a fluid nature, or relatively so, with the result that it makes exceedingly intimate contact with the walls of the two opposed relatively movable members between which it is the function of the packing to prevent leakage, and the other of which serves primarily as a mechanical support for the fluid packing element, retaining the latter against escape from the chamber or recess provided in one or both of the walls for the retention of the packing member.

A still more detailed object in this connection is the provision, in a flexible pipe joint of the character indicated, of a packing member in the form of the fluid packing element and the supporting element already referred to, and an additional relatively non-fluid packing element on the opposite side of the fluid element from the first mentioned supporting element, the relatively fluid element being confined between opposed supporting elements, each of which not only serves to confine the fluid element, but also contributes to the total sealing efficiency of the packing by co-operating with the fluid in establishing a seal with the walls of the movable members.

It is a further object of our invention to provide an improved type of flexible pipe joint, and highly efficient packing means therefor, which, in spite of their ability to conduct fluid materials difficult or impossible to confine by known packings at high pressures and high temperatures, are relatively simple in construction and accordingly inexpensive to produce, and which are quite rugged and therefore capable of standing up under hard usage and over long periods of time.

The invention possesses other objects and features of advantage, some of which, with the foregoing, will be set forth in the following description of the preferred forms of our invention illustrated in the drawing accompanying and forming a portion of the specification. It is to be understood that we do not limit ourselves to the showing made by the said drawing and description, as we may adopt variations of the preferred forms within the scope of our invention as set forth in the claims.

Referring to the drawing:

Figure 1 is a view illustrating one manner of employing swing joints of the type to which those of our invention belong, in forming a flexible pipe line.

Figure 2 is an enlarged view, partly in side elevation and partly in medial section, of one form of swing joint embodying the principles of the present invention. The joint here illustrated is of the type known in the trade as the "3-way swivel" coupling.

Figure 2 illustrates a preferred embodiment of our invention which is in the form of a 3-way swing joint inasmuch as it is provided with three separate swivels 66, 67, and 68, respectively. Each of these swivels is retained in assembled relation through the expedient of ball bearings 69 which are disposed in complementary and aligned grooves 71 and 72 in the opposed walls of the male and female members 73 and 74 respectively which they are intended to interconnect. Hence, these balls 69 serve the double function of providing the anti-friction means between the relatively movable sections of the joint and also as the mechanical means for locking the sections together.

It is preferred that a fitting 75 be provided communicating with the grooves 71 and 72 of each swivel to facilitate the ready introduction of oil or grease to the balls 69; and each swivel also carries a pressure-relief valve 76 so as to prevent development of excessive pressures upon the lubricant supplied to the balls 69.

In the swivels of the joint of Figure 2 the mechanical packing annuli 79 and 81 are of the same diameter and they are disposed side by side concentric with the bores of the pipe sections between which they are relied upon to prevent leakage. Similarly, the spacing annulus 77 relied upon to retain the two mechanical packers in spaced relationship is of substantially this same diameter. Each of these spacing annuli 77 is of materially less cross-sectional area than the space 78 between the mechanical packing annuli 79 and 81 so as to provide a space or reservoir for the reception of the fluid sealing means which forms one of the elements of the packer for each of the swivels. In each instance in the joint of Figure 2 the metal spacing annulus seats against a shoulder 82, 83, 84, respectively, formed on the outer circumferences of the cylindrical end of the male element of the swivel to limit the distance that the spacing annulus can be pushed by the inner mechanical packer when pressure is imposed upon the latter from the fluid being conducted by the joint. In this manner interference with free operation of the outer packer by the inner is definitely prevented.

As one example of the many types of service to which our coupling is adaptable advantageously, the coupling of Figure 2 is illustrated at 96, 97, and 98 in Figure 1 as being operatively installed in a pipe line 92 utilized for conveying oil from a dock 93 to a vessel anchored offshore.

Installed in the manner illustrated, the couplings 96, 97 and 98 introduce flexibility to the pipe line, and thereby permit freedom of movement of the offshore end of the line in order to enable it to accommodate itself to such movements as may arise from rising and falling of the vessel with the tides, rolling and pitching with the waves, variation in the actual distance of the outer end of the line from the shore, and even a limited amount of movement in a direction parallel to the shore line.

We claim:
1. In a swivel pipe coupling of the character described, male and female pipe elements in cooperative relation, anti-friction means interconnecting said male and female elements for relative rotation, and packing means between said male and female elements comprising a pair of packers disposed within a recess between said pipe elements, and separate means upon said male pipe element individually supporting each of said packers and comprising a shoulder supporting the outermost of said packers and a removable flange supporting the innermost of said packers, said flange leaving a space between said packers for fluid sealing means.

2. In a swivel pipe coupling of the character described, male and female pipe elements in cooperative relation, anti-friction means interconnecting said male and female elements for relative rotation, packing means between said male and female elements comprising a pair of packers disposed within a recess between said pipe elements, and separate means upon said male pipe element individually supporting each of said packers and comprising a shoulder supporting the outermost of said packers and a removable flange supporting the innermost of said packers, said flange comprising a central body portion and a face engaging said male pipe element and cooperating with said packing means to maintain a space between said packers for fluid sealing means.

FRANK M. ALLEN.
CLYDE B. TAYLOR.